United States Patent
Cullen

(10) Patent No.: US 6,313,055 B1
(45) Date of Patent: *Nov. 6, 2001

(54) REFRACTORY CASTABLES CONTAINING THERMAL BLACK

(75) Inventor: Robert M. Cullen, Bethel Park, PA (US)

(73) Assignee: Harbison-Walker Refractories Company, Pittsburgh, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/137,375

(22) Filed: Aug. 20, 1998

(51) Int. Cl.[7] .................................................. C04B 35/52
(52) U.S. Cl. .............................................................. 501/99
(58) Field of Search ................................... 106/801, 802; 501/108, 109

(56) References Cited

U.S. PATENT DOCUMENTS

| | | |
|---|---|---|
| 2,339,163 | 1/1944 | Friedlaender et al. . |
| 2,912,341 | 11/1959 | Ricker . |
| 2,948,627 | 8/1960 | Feild . |
| 3,226,240 | 12/1965 | Crowley . |
| 3,232,772 | 2/1966 | Hilton et al. . |
| 3,600,203 | 8/1971 | Aldera . |
| 3,656,983 | 4/1972 | Sulinski . |
| 3,802,894 | 4/1974 | Prost et al. . |
| 3,817,770 | 6/1974 | Dunworth et al. . |
| 3,973,978 | 8/1976 | Nakagawa et al. . |
| 4,033,782 | 7/1977 | Ray et al. . |
| 4,055,437 | 10/1977 | Petrak . |
| 4,082,561 | 4/1978 | Nakagawa et al. . |
| 4,357,167 | 11/1982 | Kellet et al. . |
| 4,444,593 | 4/1984 | Schutz . |
| 4,481,037 | 11/1984 | Beale et al. . |
| 4,623,393 | 11/1986 | Masumi et al. . |
| 4,710,225 | 12/1987 | Rucker . |
| 4,904,503 | 2/1990 | Hilton et al. . |
| 4,943,544 | 7/1990 | McGarry et al. . |
| 4,957,887 | * 9/1990 | Michael et al. . |
| 4,981,731 | 1/1991 | Yorita et al. . |
| 4,992,103 | 2/1991 | Smart . |
| 5,098,873 | 3/1992 | Edwards et al. . |
| 5,147,834 | 9/1992 | Banerjee . |
| 5,151,203 | 9/1992 | Riley et al. . |
| 5,160,376 | 11/1992 | Kikuchi et al. . |
| 5,219,807 | 6/1993 | Pavlica et al. . |
| 5,246,163 | 9/1993 | Amano et al. . |
| 5,250,479 | * 10/1993 | Rancoule et al. . |
| 5,269,845 | 12/1993 | Grunau et al. . |
| 5,284,808 | 2/1994 | Damiano et al. . |
| 5,302,563 | 4/1994 | Rumpeltin et al. . |
| 5,328,879 | 7/1994 | Kloss et al. . |
| 5,512,325 | 4/1996 | Langenohl et al. . |
| 5,549,745 | 8/1996 | Langenohl et al. . |
| 5,628,940 | 5/1997 | Allison . |
| 5,766,689 | 6/1998 | Ono . |

FOREIGN PATENT DOCUMENTS

| | | |
|---|---|---|
| 0 506 421A1 | 9/1992 | (EP) . |
| 0 742 416A1 | 11/1996 | (EP) . |
| 0 798 279A1 | 10/1997 | (EP) . |
| 2059789 | 6/1972 | (FR) . |
| 2 165 834A | 4/1986 | (GB) . |
| 2166130 | 4/1986 | (GB) . |
| PCT/US9803910 | 2/1998 | (WO) . |

OTHER PUBLICATIONS

Application of MgO–C Castable for Ladle Furnace Slag Line, Taikabutsu, Teranishi, et al., vol. 49, No. 7, Jul. 1997, pp. 391–396.

Application of MgO–C Castable to Ladle Furnace Slag Line, Taikabutsu Overseas, Teranishi, et al., Mar. 1998, vol. 18, No. 1, pp. 38–42.

* cited by examiner

*Primary Examiner*—Paul Marcantoni
(74) *Attorney, Agent, or Firm*—Craig G. Cochenour; Buchanan Ingersoll, P.C.

(57) ABSTRACT

A refractory castable composition is disclosed comprising one hundred weight percent of a refractory composition comprising from about 60 to 90 weight percent of a refractory aggregate, from about 2 to 25 weight percent of an ultrafine refractory material having an average particle diameter size less than or equal to about 3 microns, from about 0.5 to 15 weight percent of a binder, and from about 0.05 to 2.0 weight percent of a dispersant, wherein all or a portion of the ultrafine refractory material comprises a thermal black such that the refractory composition comprises from about 2 to 15 weight percent of the thermal black, and from about 3 to 10 weight percent water based upon 100 weight percent of the refractory composition, and wherein the water is present in an amount sufficient to achieve a castable consistency. A method of installing the refractory castable composition is also disclosed.

14 Claims, No Drawings

REFRACTORY CASTABLES CONTAINING THERMAL BLACK

BACKGROUND OF THE INVENTION

1. Field of the Invention

This invention relates to a refractory composition and castable. The refractory composition comprises a refractory aggregate, an ultrafine refractory material having an average particle diameter size less than or equal to about 3 microns, a binder, and a dispersant, wherein all or a portion of the ultrafine refractory material comprises thermal black. This invention also relates to a refractory castable composition comprising the refractory composition of the instant invention and water in an amount sufficient to achieve a castable consistency for casting the refractory castable composition with the use of forms.

Further, this invention relates to an essentially non-slumping, high density, low moisture sprayable refractory castable composition which can be applied without forms, comprising a tempered, pumpable first component comprising the refractory castable composition as disclosed herein, and a second component comprising at least one flocculating agent that is added to the first component at the time of installation of the sprayable refractory castable composition in an amount to prevent slumping. A method of applying the essentially non-slumping, high density, low moisture sprayable refractory castable composition is provided.

2. Brief Description of the Background Art

A considerable amount of work has been done by those skilled in the art to improve the properties of refractory castables. For example, much work has been done to lower the water content required for casting calcium aluminate cement bonded high alumina and fireclay refractory castables. It is well known by those skilled in the art that a reduction in the water content required for casting leads to higher density and lower porosity, ultimately resulting in refractory castables that perform better in service.

The reduction in water content required for casting refractory castables has resulted from the use of dispersants and ultrafine particles in combination with particle packing principles. The dispersants minimize formation of flocs that raise water requirements. More optimum particle packing has been achieved by using progressively finer particles to fill in the voids between the coarser aggregates. Without these ultrafine particles, the voids between the coarser aggregates would fill with water during casting, thus, increasing the amount of water needed in the refractory castable. It will be appreciated by those skilled in the art that a substantial reduction in the amount of water required for casting refractory castables was realized with the discovery that ultrafine particles (i.e. particles having a diameter of less than about three microns) could be included in the products when used with appropriate dispersants. The ultrafine particles used for this purpose have been ultrafine refractory materials, namely, oxides, such as for example, microsilica and finely ground alumina being the most common choices. European Patent EP 0742416 (hereinafter EP '416) discloses a spray operation method for monolithic refractories wherein a fine powder of alumina or fumed silica having a particle size of at most three microns imparts good flowability to the mixed batch of monolithic refractories. U.S. Pat. No. 5,549,745 (Langenohl et al.) (hereinafter U.S. '745) and U.S. Pat. No. 5,512,325 (Langenohl et al.) (hereinafter U.S. '325) disclose a non-slumping, high density, low moisture, low cement sprayable refractory castable composition which can be applied without forms containing a solid flow aid that is microsilica, 1 to 3 micron alumina, or mixtures thereof Despite their effectiveness in lowering water requirements for casting, there are drawbacks to using microsilica and ultrafine alumina. For example, microsilica typically reduces high temperature refractoriness of refractory castables. In high alumina and fireclay castables bonded with calcium aluminate cement, for example, the microsilica combines with lime from the calcium aluminate cement when the castable is heated, forming low melting point glasses. These glasses cause major disadvantages such as for example, but not limited to, making the castable more one to creep at high temperatures, decreasing the hot strength and increasing the susceptibility of the castable to chemical corrosion. In an attempt to deal with the problem of glass formation, refractory compositions with either no calcium aluminate cement, or reduced levels of calcium aluminate cement have been developed. The resulting lower lime contents reduce the amount of low melting glass that forms, but refractoriness is still not optimized because the microsilica in the matrix of the castable remain susceptible to chemical alteration and fluxing by constituents commonly found in the environments in which the castables were used. Ultrafine alumina, when used to reduce the water required for casting refractory castables, is a substantial commercial impediment because of its high cost. In addition, ultrafine alumina can have a detrimental effect on the rheology of refractory castables, in particular those that are bonded with calcium aluminate cement. Refractory castables containing calcium aluminate cement and ultrafine alumina can exhibit short working times and poor casting characteristics. While not fully understood, it is believed that the ultrafine alumina provides nucleation sites for precipitation of hydrate phases from solution during mixing and placement of the castables. It is known by those skilled in the art that alumina-lime hydrate phases form on the edges of ultrafine alumina particles in suspensions of ultrafine alumina and calcium aluminate cement in water. It is believed that these hydrate phases affect the morphology of the finest constituents in the refractory castables, thereby adversely affecting rheology and casting characteristics.

Other ultrafine refractory oxides for reducing the amount of water required for casting refractory castables have similar drawbacks. For example, ultrafine chromic oxide is expensive and is undesirable from an environmental standpoint. Ultrafine titania is also expensive and is generally regarded as a flux in refractory systems. Thus, despite the ability of various ultrafine refractory oxides to reduce the water required for casting refractory castables, no ultrafine refractory material heretofore has been found that is wholly satisfactory from either a technical, environmental, or economic standpoint. Further, it will be appreciated by those skilled in the art, that no ultrafine refractory material heretofore has been found that provides for reducing the amount of conventional ultrafine refractory oxides employed or for eliminating the use of conventional ultrafine refractory oxides to fill in the voids between the coarser refractory aggregates while at the same time maintaining particle packing principles for reducing the water content required for casting.

Therefore, in spite of this background material, there remains a very real and substantial need for a refractory composition, castable, and spray mix having an ultrafine refractory material that is capable of lowering the amount of water required for casting or spraying the refractory castable composition while at the same time reducing or eliminating the undesirable characteristics of the ultrafine refractory particles disclosed by the background art.

SUMMARY OF THE INVENTION

The present invention has met the above-described needs. The present invention provides a refractory composition comprising a refractory aggregate, an ultrafine refractory material having an average particle size diameter less than or equal to about 3 microns, a binder, and a dispersant and wherein all or a portion of the ultrafine refractory material comprises a thermal black such that the refractory composition comprises from about 2 to 15 weight percent thermal black. The present invention further provides a refractory castable composition comprising the refractory composition of this invention as described herein and water present in an amount sufficient to achieve a castable consistency.

Another embodiment of the present invention provides a method of using the refractory castable composition with forms or molds to produce a castable refractory product of a desired shape. This method provides for the manufacture of a castable refractory product comprising casting the refractory castable composition of the instant invention as described herein, to form a refractory shape or lining.

In another embodiment of this invention, an essentially, non-slumping, high density, low moisture sprayable refractory castable composition is provided that is applied without forms. This sprayable refractory castable composition of the present invention comprises (a) a tempered, pumpable first component comprising 100 weight percent of the refractory castable composition, as disclosed herein, and (b) a second component comprising a flocculating agent. The flocculating agent is added to the first component of the sprayable refractory castable composition for achieving installation of the sprayable refractory castable composition in an amount sufficient to prevent slumping.

Another embodiment of this invention provides a method of applying the essentially, non-slumping, high density, low-moisture sprayable refractory castable composition of the present invention, as described herein, on a surface without the use of forms, with a pump means and an associated hose means and an associated nozzle means comprising (a) preparing a tempered pumpable first component comprising (i) 100 weight percent of a refractory composition comprising a refractory aggregate, an ultrafine refractory material having an average particle diameter size less than or equal to about three microns, a binder, and a dispersant and wherein all or a portion of the ultrafine refractory material comprises a thermal black such that the refractory composition comprises from about 2 to 15 weight percent thermal black, and (ii) from about 3 to 10 weight percent water based upon 100 weight percent of the refractory composition, wherein the water is present in an amount sufficient to achieve a pumpable consistency of the first component to enable the first component to be pumped and applied through the pump means, the hose means and the nozzle means, (b) adding a second component comprising a flocculating agent to the first component to form a refractory castable composition, wherein the flocculating agent is added to the first component at or prior to the time of the application of the refractory castable composition through the nozzle means, (c) introducing air through the nozzle means just prior to the time of the application of the refractory castable composition and (d) applying the refractory castable composition to the surface without the use of forms.

DETAILED DESCRIPTION

The present invention provides a refractory composition comprising from about sixty (60) to ninety (90) weight percent of a refractory aggregate, from about two (2) to twenty-fifty (25) weight percent of an ultrafine refractory material having an average particle diameter size of less than or equal to about three (3) microns, from about one-half (0.5) to fifteen (15) weight percent of a binder, and from about five one-hundredth (0.05) to two (2.0) weight percent of a dispersant, wherein all or a portion of the ultrafine refractory material comprises a thermal black such that the refractory composition comprises from about two (2) to fifteen (15) weight percent thermal black.

Another embodiment of the instant invention provides a refractory castable composition comprising (a) one-hundred (100) weight percent of a refractory composition comprising from about sixty (60) to ninety (90) weight percent of a refractory aggregate, from about two (2) to twenty-five (25) weight percent of an ultrafine refractory material having an average particle diameter size less than or equal to about three (3) microns, from about one-half (0.5) to fifteen (15) weight percent of a binder, and from about five one-hundredth (0.05) to two (2.0) weight percent of a dispersant, wherein all or a portion of the ultrafine refractory material comprises a thermal black such that the refractory composition comprises from about two (2) to fifteen (15) weight percent of the thermal black, and (b) from about three (3) to ten (10) weight percent water based upon one hundred (100) weight percent of the refractory composition, wherein the water is present in an effective amount sufficient to achieve a castable consistency.

As used herein, the term "effective amount" refers to that amount of a substance necessary to bring about a desired result, such as, for example, the amount of water needed to achieve a consistency suitable for installing the refractory castable composition of the present invention, such as for example, casting, pumping, spraying and combinations thereof The refractory aggregate used in the instant invention can be any suitable for linings for metallurgical vessels. For example, but not limited to, the refractory aggregate comprises at least one of an alumina, a tabular alumina, a fused alumina, a calcined alumina, a sintered alumina, a bauxite, a bauxitic kaolin, a diaspore, a mullite, an aluminous shale, a chamotte, a silica rock, a pyrophyllite, a sillimanite, a crude andalusite, a calcined andalusite, a calcined fire clay, a crude kyanite, a calcined kyanite, a zirconia, a zircon, a chromic oxide, a silicon nitride, a graphite, a carbonaceous material, a vitreous silica, a fused silica, an aluminum nitride, a silicon carbide, a boron carbide, a titanium boride, a zirconium boride, a magnesium oxide, a magnesite, a deadburned magnesite, a spinel, a rare earth oxide, and combinations thereof, and other like refractory aggregates.

The ultrafine refractory material used in the instant invention can be any suitable for linings of metallurgical vessels. For example, but not limited to, the ultrafine refractory material comprises a thermal black alone or in combination with at least one of an alumina, a titania, a bauxite, a diaspore, a mullite, an aluminous shale, a chamotte, a pyrophyllite, a sillimanite, an andaulsite, a silica rock, an amorphous silica, a fumed silica, a microsilica, a silica fume, a zirconia, a zircon, a chromic oxide, a silicon nitride, a graphite, a carbonaceous material, an aluminum nitride, a silicon carbide, a boron carbide, a zirconium boride, a titanium boride, a magnesium oxide, a magnesite, a deadburned magnesite, a spinel, a rare earth oxide, and combinations thereof, and other like ultrafine refractory powders. The ultrafine refractory material of this invention has an average particle diameter size of less than or equal to three (3) microns. All or a portion of the ultrafine refractory material of the instant invention comprises a thermal black such that the refractory composition comprises from about two (2) to fifteen (15) weight percent thermal black.

The binder used in the instant invention can be any suitable for linings of metallurgical vessels. For example, but not limited to, the binder comprises at least one of a calcium aluminate cement, a phenolic resin, pitch, an alkali silicate, a phosphate-modified aluminum silicate, and combinations thereof, and other like binders. The alkali silicate is, such as, for example, sodium silicate or potassium silicate. The phosphate-modified aluminum silicate is commercially available as "LITHOPIX AS 85" from Zschimmer & Schwarz Gmbh. & Co., D-5420 Lahnstein, Rhein, Germany.

The calcium aluminate cement can be any hydraulic setting calcium aluminate cement, and preferably is utilized at a concentration of about 1 to 15 weight percent (wt. %). Such calcium aluminate cements contain mainly calcium aluminate phases, although in some cases alumina and/or rheological agents are added. Calcium aluminate cements are commercially available such as, for example, having about 40 to 90 weight percent (wt. %) alumina and about 10 to 35 wt. % calcia.

It is preferable in the instant invention to use high purity calcium aluminate cements such as, for example, those containing virtually only calcium aluminate phases and alumina without any rheology additives. Commercially available high purity calcium aluminate cements contain, such as, for example, about 70 weight percent alumina and about 30 weight percent calcia, such as, for example, "CA-14" available from ALCOA, Pittsburgh, Pa., and "SECAR 71" available from Lafarge Calcium Aluminates, Inc., Chesapeake, Va.

A cement-free binder may also be used as the binder in the refractory compositions and castables of the instant invention either alone, in combination with each other, or in combination with the calcium-aluminate cement as described herein. Such cement-free binders are well known by those skilled in the art and include such as, for example, but not limited to complex phosphates such as the hereinbefore mentioned phosphate-modified aluminum silicate, alkali silicates, organic resins or pitch. Preferably, the cement-free binder is a resin such as, for example, a phenolic resin, a pitch, or a combination thereof As stated hereinbefore, by employing an ultrafine refractory material having all or a portion thereof comprising thermal black, the instant invention overcomes the limitations and disadvantages of ultrafine particles previously used by those skilled in the art such as, for example, microsilica, ultrafine alumina (i.e. alumina having a particle diameter from about 0.5 to 3 microns), chromic oxide and titania. It is generally well known by those skilled in the art that ultrafine particles, such as microsilica, and ultrafine alumina, in combination with suitable dispersants, reduce the water requirements for casting refractory castable compositions. As stated herein, the ultrafine particles utilized by those skilled in the art prior to the instant invention, although capable of reducing the amount of water needed for casting the refractory composition, have certain disadvantages. For example, microsilica decreased the refractoriness of the composition or made it more susceptible to chemical attack. In addition, ultrafine alumina can detrimentally effect the rheology of the refractory castable composition. By employing a refractory composition comprising from about 2 to 15 weight percent thermal black having an average particle diameter size less than or equal to about 3 microns, the use of known conventional ultrafine particles can be effectively reduced or eliminated.

The thermal black of the instant invention is a specific type of carbon black made from natural gas or for example, but not limited to, the pyrolysis of bituminous coal. Preferably, the thermal black of the instant invention is an American Society for Testing and Materials (ASTM) Designation 1765-96 thermal black having an average nitrogen surface area from about 0 to 20 square meters per gram as defined by Classification Group Nos. 8 and 9 of the ASTM Designation 1765-96. Preferably, the refractory composition of the instant invention comprises about five (5) weight percent thermal black. As will be appreciated by those skilled in the art, thermal black is available from different sources and can be used in pelletized versions. Pelletized versions of thermal black are used with appropriate mixing to break down the pellets so that the desired effect can be achieved in the refractory composition. The thermal black source may be, for example, a natural gas source, such as the N-990 type (ASTM) thermal blacks commercially available from Cancarb Limited, Medicine Hat, Alberta, Canada, or Engineered Carbons, Inc., Borger, Tex. It is important for those persons skilled in the art to understand that the present inventors have unexpectantly found that thermal blacks when employed as the ultrafine refractory material in the refractory composition of the instant invention provide for the reduction in water required for casting of the refractory composition and also improve the physical properties of the resulting refractory castable product. Further the present inventors have found that other forms of carbon black in the form of ultrafine refractory material such as for example, furnace blacks do not produce the unexpected benefits provided by the thermal blacks of the instant invention.

With respect to the dispersant of the instant invention, it must be able to disperse the thermal black as well as the other constituents of the refractory castable composition when water is added to the refractory castable composition. Combinations of dispersants are sometimes desirable depending on the specific constituents in the refractory castable composition. The dispersant(s) employed in the instant invention is a dispersant(s) known to those skilled in the art and include such as, for example, but not limited to anionic dispersing agents. Examples of anionic dispersing agents include, for example, but not limited to, polymerized alkyl naphthalene sulfonic acids and salts thereof and modified lignins such as, for example, lignosulfonates and salts thereof. The polymerized alkyl naphthalene sulfonic acid is commercially available as the sodium salt form under the trade name "DAXAD 11" commercially available from W.R. Grace & Co., Lexington, Mass. The modified lignins of the instant invention may be used in liquid and powder forms and may be derived from the kraft pulping process or the sulfite pulping process known by those skilled in the art. The modified lignins used in the instant invention, may be, for example, but not limited to, fractionated lignins in terms of molecular weight, purified or may be used in either the protonated or salt forms. Preferably, the modified lignin is a purified desulphonated sodium lignosulfonate, such as, for example, that is commercially available under the trade name "MARASPERSE CBA-1" from LignoTech USA, Inc., Bridgewater, N.J. Other forms of the modified lignin of the instant invention include such as, for example, but not limited to calcium lignosulfonates available commercially in a liquid form and a solid form under the trade names "NORLIG H" and "WAFEX" respectively, from LignoTech USA, Inc, Bridgewater, N.J.

The refractory composition of the instant invention has for each 100 weight percent of the castable solids of the refractory composition from about 0.05 to 2.0 weight percent dispersant, and more preferably about 0.2 weight percent dispersant.

It will be appreciated by those persons skilled in the art that other additives may be used in combination with the dispersants of the instant invention to affect the rheology of the castable. Such additives include such as, for example, but not limited to, boric acid or citric acid retarders. Such additives are added in the amount from about 0.01 to 1.0 weight percent for each 100 weight percent of the castable solids of the refractory castable composition.

The amount of water used in the refractory castable composition of the instant invention is the effective amount needed to achieve a castable consistency of the constituent components of the base mix (i.e. refractory aggregate, ultrafine refractory material, binder, and dispersant) of the refractory castable composition such as, for example, from about 3.0 to 10.0 weight percent water for each 100 weight percent of the constituent components of the base mix of the refractory castable composition. More preferably from about 3.0 to 7.0 weight percent water for each 100 weight percent of the constituent components of the base mix of the refractory castable is employed to attain the highest possible density and strength of the resulting refractory castable while also ensuring proper flow during casting.

In another embodiment of the instant invention, at least one metal is added to the refractory compositions and castables, as described herein. The metal is, such as, for example, aluminum, silicon, and magnesium, and alloys thereof, and/or combinations thereof The metals are used in powdered or granular form. The metals, in addition to inhibiting carbon oxidation at elevated temperatures, react with the thermal black at temperatures above about 1470° Fahrenheit (F) to form carbides which enhance bonding and therefore increase the strength of the refractory castable composition of the instant invention. The metal additions are employed from about one to ten weight percent(wt. %) based upon one hundred weight percent of the refractory composition.

In another embodiment of the instant invention, a refractory composition is provided, as described herein, that further comprises the addition of fibrous material compatible with refractory compositions as known by those skilled in the art, such as for facilitating the removal of moisture upon heating. The fibrous material is, for example, but not limited to vinyl acetate and vinyl chloride fibers commercially available under the trade name "Vinyon" from Waker USA, Norwalk, Conn. The fibrous material additions are employed from about one-tenth (0.1) to one (1.0) weight percent based upon one hundred (100) weight percent of the refractory composition.

Another embodiment of the present invention provides a method of using the refractory castable composition with forms or molds to produce a castable refractory product of a desired shape. This method provides for the manufacture of a castable refractory product comprising casting the refractory castable composition of the instant invention as described herein to form a refractory shape or lining.

In another embodiment of this invention, an essentially, non-slumping, high density, low moisture sprayable refractory castable composition is provided that is applied without forms. This sprayable refractory castable composition of the present invention comprises (a) a tempered, pumpable first component comprising (i) 100 weight percent of a refractory castable composition wherein the refractory castable composition comprising from about 60 to 90 weight percent of a refractory aggregate, from about 2 to 25 weight percent of an ultrafine refractory material having an average particle diameter size less than or equal to about 3 microns, from about 0.5 to 15 weight percent of a binder, and from about 0.05 to 2.0 weight percent of a dispersant, wherein all or a portion of the ultrafine refractory material comprises a thermal black such that the refractory composition comprises from about 2 to 15 weight percent of the thermal black, and (ii) from about 3 to 10 weight percent water based upon 100 weight percent of the refractory composition, wherein the water is present in an amount sufficient to achieve a pumpable consistency; and (b) a second component comprising a flocculating agent. The flocculating agent is added to the first component of the sprayable refractory castable composition at or prior to the installation of the sprayable refractory castable composition to a surface without the use of forms. The flocculating agent is added to the first component in an amount to prevent slumping. Preferably, the amount of flocculating agent added for each 100 weight percent of the first component castable solids is from about 0.1 to 2.5 weight percent.

The flocculating agent used in the instant invention can be any suitable for refractory use. For example, but not limited to, the flocculating agent comprises at least one of the agents selected from the group of an alkali chloride, an alkaline-earth chloride, an alkali phosphate, a calcium hydroxide, a calcium oxide, a calcium aluminate, a potassium aluminate, and an alkali silicate. Preferably, the flocculating agent is an alkaline-earth chloride, such as for example, calcium chloride, or an alkali phosphate, such as for example, dipotassium phosphate.

In another embodiment of the present invention, the sprayable refractory castable composition as disclosed herein is provided further comprising from about 1.0 to 10 weight percent of at least one metal, as disclosed herein.

In yet another embodiment of the instant invention, the sprayable refractory castable composition, as disclosed herein, further comprises at least one of a plasticizer (i.e. such as, for example, a ball clay), a retardant agent (i.e. such as, for example, citric acid or boric acid retarders), a fibrous material, and combinations thereof, as will be appreciated and in amounts known by those skilled in the art.

Another embodiment of the present invention provides a method of applying the essentially, non-slumping, high density, low-moisture sprayable refractory castable composition of the present invention, as described herein, on a surface without the use of forms, with a pump means and an associated hose means and an associated nozzle means comprising (a) preparing a tempered pumpable first component comprising (i) 100 weight percent of a refractory composition comprising a refractory aggregate, an ultrafine refractory material having an average particle diameter size less than or equal to about three microns, a binder, and a dispersant and wherein all or a portion of the ultrafine refractory material comprises a thermal black such that the refractory composition comprises from about 2 to 15 weight percent thermal black, and (ii) from about 3 to 10 weight percent water based upon 100 weight percent of the refractory composition, wherein the water is present in an amount sufficient to achieve a pumpable consistency of the first component to enable the first component to be pumped and applied through the pump means, the hose means and the nozzle means, (b) adding a second component comprising a flocculating agent to the first component to form a sprayable refractory castable composition, wherein the flocculating agent is added to the first component to form the sprayable refractory castable composition at or just prior to the time of application of the sprayable refractory castable composition, (c) introducing air through the nozzle means just prior to the time of the application of the sprayable refractory castable composition, and (d) applying the sprayable refractory castable composition to a surface without the use of forms. Preferably, the method as disclosed herein, comprises adding the flocculant agent to the first component through the nozzle means to form the sprayable refractory castable composition just prior to the time of application of the sprayable refractory castable composition through the nozzle means. It will be understood by those persons skilled in the art that in another embodiment of the present invention, a method of applying the sprayable refractory castable composition, as disclosed herein, is provided comprising adding the flocculating agent to the first component at a point upstream from the nozzle means, such as for example, through the hose means.

It will be appreciated by those skilled in the art that another embodiment of the method of applying the sprayable refractory castable composition of the present invention comprises adding at least one metal, as disclosed herein, to the sprayable refractory castable composition. Further, the method of the instant invention further comprises adding at least one of a plasticizer, a retardant agent, and a fibrous material, and combinations thereof, as disclosed herein, in amounts known by those skilled in the art, to the sprayable refractory castable composition of the present invention.

EXAMPLES

The following examples demonstrate the instant invention in greater detail. These examples are not intended to limit the scope of the instant invention in any way. In the examples, the following products were used:

Tabular Alumina is a refractory aggregate having greater than or equal to about ninety-nine weight (99.0) percent aluminum oxide material commercially available from Aluminum Company of America, Pittsburgh, Pa., and is preferably used as a −3 mesh fraction (7.10 millimeter) and finer particles to provide a size distribution for optimum flow characteristics and density, as will be understood by those persons skilled in the art.

The Reactive Aluminas are ultrafine refractory material about 0.4 micron and 3.0 microns average particle diameter size, respectively, and are greater than or equal to ninety-nine (99.0) weight percent aluminum oxide material, commercially available under the trade names "A-1000-SGD" and "A-3000-FL", respectively, from Aluminum Company of America, Pittsburgh, Pa.

Calcium Aluminate Cement is a 70 percent alumina and 30 percent calcia cement commercially available under the trade name "SECAR 71" from Lafarge Aluminates, Inc., Chesapeake, Va.

Microsilica is a 0.5 micron average particle size microsilica commercially available under the trade name "EMS 965" from Elkem Materials, Inc., Pittsburgh, Pa.

The thermal black is "Thermax Floform N-990", commercially available from Cancarb Limited, Medicine Hat, Alberta, Canada, or "N-990 Thermal Carbon Black", commercially available from Engineered Carbons, Inc., Borger, Tex.

The furnace black is "N-774 Furnace Carbon Black" commercially available from Engineered Carbons, Inc., Borger, Tex.

Silicon metal is a −200 mesh (0.075 millimeter) silicon powder commercially available from Globe Metallurgical, Inc., Beverly, Ohio.

Sodium tripolyphosphate is a dispersant commercially available under the trade name "HYSORB" technical grade from FMC Corporation, Bedford Park, Ill.

Daxad 11 is an anionic dispersant that is a sodium salt of a polymerized alkyl naphthalene sulfonic acid commercially available from W.R. Grace & Co., Lexington, Mass.

Marasperse CBA-1 is a dispersant that is a modified lignin comprising a desulphonated sodium lignosulfonate commercially available from LignoTech USA, Bridgewater, N.J.

Vinyon Fiber is a fibrous material of vinyl acetate and vinyl chloride fibers commercially available from Waker, USA, Norwalk, Conn.

Examples 1 to 5

Five high alumina, ultralow cement refractory castable compositions are set forth in Table I below. Example 1 is a standard refractory castable composition mix as known by those skilled in the art employing microsilica and Reactive Aluminas as the ultrafine refractory material and sodium tripolyphosphate as the dispersant. Example 2 sets forth a refractory castable composition for comparison purposes wherein sodium tripolyphosphate is the dispersant and thermal black and Reactive Aluminas are the ultrafine refractory material. Examples 3, 4, and 5 set forth various mix formulations of the refractory castable compositions of this invention employing thermal black and Reactive Aluminas as the ultrafine refractory material and a dispersant other than sodium tripolyphosphate.

Table I sets forth the mix formulations for Examples 1–5, and the casting characteristics, physical properties after drying at 230° F. (Fahrenheit) and after coking at 2000° F., along with high temperature strength testing.

The flow diameter test set forth in Tables I, II and III is performed on a small vibrating table. A ½-pound ball of wet mix of the formulation of each example is placed on the table and vibrated for 15 seconds at a set frequency. After vibration, the diameter of the slumped ball is measured and recorded.

The results set forth in Table I show that by substituting thermal black for microsilica in a refractory castable composition, the casting characteristics can be significantly improved using the same or similar water content. Example 1 is a conventional ultralow cement refractory castable composition, well known by those skilled in the art, containing 5 weight percent microsilica and 10 weight percent Reactive Aluminas as the ultrafine refractory materials and sodium tripolyphosphate as the dispersant. This example had fair flow characteristics and satisfactory physical properties. Example 2 sets forth a comparative composition wherein thermal black is employed as the ultrafine refractory material in place of microsilica, and wherein the same sodium tripolyphosphate dispersant is used as in Example 1. It will be appreciated by those skilled in the art that Example 2 has poor to no flow and significantly inferior physical properties compared with those for Example 1. Examples 3 and 4 set forth the present invention wherein thermal black is employed as the ultrafine refractory material in place of microsilica, but dispersants specifically designed to disperse thermal black in an aqueous solution are used in place of sodium tripolyphosphate. The casting characteristics for the castable composition of Examples 3 and 4 are good to very good, and the density and porosity values are similar to those of Example 1, indicating good material flow and compaction. The high temperature strengths of the compositions of this invention, Examples 3 and 4, containing thermal black are less than those for the mix of Example 1 containing conventional microsilica as the ultrafine refractory material. This is due to the inert, non-reactive nature of the thermal black when used in combination with a calcium aluminate cement in the bonding matrices of the compositions. This is partially overcome by the addition of metals to the mix of Example 5 of the present invention that results in the formation of carbides at temperatures beginning at about 1470° F. (Fahrenheit) which strengthens the bonding matrix. The use of a metal(s) addition can also provide for improved oxidation resistance, which is important when carbon-containing mixes are used in oxidizing atmospheres.

TABLE I

| Example Number: | 1<br>Wt. % | 2<br>Wt. % | 3<br>Wt. % | 4<br>Wt. % | 5<br>Wt. % |
|---|---|---|---|---|---|
| Mix Formulations: | | | | | |
| Tabular Alumina (−3 mesh and finer) | 83.5 | 83.5 | 83.5 | 83.5 | 80.5 |
| Reactive Alumina (0.4 micron) A-1000SGD | 5.0 | 5.0 | 5.0 | 5.0 | 5.0 |
| Reactive Alumina (3.0 micron) A-3000-FL | 5.0 | 5.0 | 5.0 | 5.0 | 5.0 |
| Calcium Aluminate Cement | 1.5 | 1.5 | 1.5 | 1.5 | 1.5 |
| Microsilica | 5.0 | — | — | — | — |
| Thermax Floform N-990 Thermal Black (Cancarb Limited) | — | 5.0 | 5.0 | 5.0 | 5.0 |
| Silicon Metal (−200 mesh) | — | — | — | — | 3.0 |
| Plus Additions: | | | | | |
| Sodium Tripolyphosphate | 0.2 | 0.2 | — | — | — |
| Daxad 11 Dispersant | — | — | 0.2 | — | — |
| Marasperse CBA-1 Dispersant | — | — | — | 0.2 | 0.2 |
| Water for casting: | 4.5 | 7.5 | 4.5 | 4.5 | 4.5 |
| Casting Characteristics | | | | | |
| Flow Diameter, inches: | 2.9 | 2.25 | 3.6 | 4.1 | 4.3 |
| Comments: | Fair | Poor to No Flow | Good | Very Good | Very Good |
| After Drying 230° F. | | | | | |
| Density from Porosity, pcf: | 195 | 176 | 196 | 197 | 193 |
| Apparent Porosity, %: | 15.0 | 22.2 | 13.5 | 13.3 | 13.6 |
| After Coking at 2000° F. | | | | | |
| Density from Porosity, pcf: | 197 | 175 | 195 | 196 | 194 |
| Apparent Porosity, %: | 15.3 | 23.8 | 15.6 | 14.8 | 14.0 |
| At 2800° F. (Reducing Atmosphere) Crushing Strength, psi: | 830 | — | 410 | 460 | 590 |

Examples 6 to 9

Table II sets forth the mix formulations for Examples 6–9. Examples 6–8 are refractory castable compositions of the present invention wherein the ultrafine refractory material is 10 weight percent Reactive Aluminas and 5 weight percent N990 thermal black and the binder is a powdered novolak resin. The powdered novolak resin employed in Table II is commercially available under the trade name Durite RD 763 A from Borden Chemical, Inc., Louisville, Ky. As shown in Table II, the refractory castable compositions of the present invention, Examples 6–8, employing thermal black as a portion of the ultrafine refractory material resulted in very good flow properties. Examples 7 and 8 illustrate that additions of fine silicon metal to the resin bonded compositions resulted in improved high temperature strength.

Example 9 illustrates a refractory castable composition of the present invention which contains thermal black and reactive alumina as the ultrafine refractory material and powdered novolak resin (as described herein) and calcium aluminate cement as the binders. Example 9 shows that the mix formulation resulted in very good flow properties and physical characteristics.

TABLE II

| Example Number: | 6<br>Wt. % | 7<br>Wt. % | 8<br>Wt. % | 9<br>Wt. % |
|---|---|---|---|---|
| Mix Formulation: | | | | |
| Tabular Alumina (−3 mesh and finer) | 82.0% | 79.0% | 77.0% | 79.0% |
| Reactive Alumina (0.4 micron) | 5.0 | 5.0 | 5.0 | 5.0 |
| Reactive Alumina (3.0 micron) | 5.0 | 5.0 | 5.0 | 5.0 |
| Calcium Aluminate Cement | — | — | — | 1.0 |
| Powdered Novolak Resin | 3.0 | 3.0 | 3.0 | 2.0 |
| Thermax Floform N-990 Thermal Black (Cancarb Limited) | 5.0 | 5.0 | 5.0 | 5.0 |
| Silicon Metal (−200 mesh) | — | 3.0 | 5.0 | 3.0 |
| Plus Additions: | | | | |
| Marasperse CBA-1 Dispersant | 0.2% | 0.2% | 0.2% | 0.2% |
| % Water for Casting: | 4.5 | 4.5 | 4.5 | 4.5 |
| Casting Characteristics | | | | |
| Flow Diameter, inches: | 4.0 | 4.0 | 4.2 | 4.1 |
| Comments: | Very Good | Very Good | Very Good | Very Good |
| After Drying at 350° F. | | | | |
| Density from Porosity, pcf: | 186 | 184 | 181 | 183 |
| Apparent Porosity, %: | 12.7 | 13.2 | 13.6 | 15.2 |
| After Coking at 2000° F. | | | | |
| Density from Porosity, pcf: | 185 | 181 | 180 | 184 |
| Apparent Porosity, %: | 18.5 | 17.2 | 16.5 | 17.0 |
| At 2800° F. (Reducing Atmosphere) Crushing Strength, psi: | 950 | 2000 | 3630 | 790 |

Examples 10 and 13

In Table III, Examples 10, 11 and 13 set forth additional examples of the mix formulations of the present invention. The mix formulation of Example 12 is set forth for comparison purposes. Examples 10 and 11 set forth mix formulations in which two different commercially available N-990 thermal blacks, respectively, are evaluated in the refractory castable compositions of the instant invention. Examples 10 and 11 contain N-990 type (ASTM) thermal carbon blacks which have an average particle size of about 0.3 micron. Example 10 contains an N-990 thermal black commercially available from Cancarb Limited, Medicine Hat, Alberta, Canada and Example 11 contains an N-990 thermal black commercially available from Engineered Carbons, Inc., Borger, Tex.

Example 12 sets forth a comparative mix formulation which contains an N-774 type (ASTM) furnace carbon black having an average particle size of 0.05 micron, commercially available from Engineered Carbons, Inc., Borger, Tex.

Example 13 sets forth a mix formulation of the present invention wherein all of the ultrafine refractory material comprises thermal black. Examples 10–13 each employ a fiber addition of polypropylene fiber commercially available under the trade name "HERCULON" non-woven staple fibers (Denier=3.0, Length=5.0 mm), commercially available from Hercules Incorporated, Wilmington, Del.

As shown by the results set forth in Table III, Examples 10 and 11, mix formulations containing the two N-990 thermal blacks, respectively, provide the same casting characteristics at the same water contents. The resulting physical properties are very similar for the mix formulation of Examples 10 and 11.

The comparative mix formulation of Example 11 containing the furnace carbon black required more water and dispersant to achieve a good flow, which resulted in inferior physical properties (i.e. apparent porosity, 18.5% after drying at 230° F., and 20.4% after coking at 2000° F.) compared to those mix formulations of Examples 10, 11, and 13 wherein all or a portion of the ultrafine refractory material comprises thermal black.

TABLE III

| Example Number: | 10 Wt. % | 11 Wt. % | 12 Wt. % | 13 Wt. % |
|---|---|---|---|---|
| Mix Formulations: | | | | |
| Tabular Alumina (−3 mesh and finer) | 83.5 | 83.5 | 83.5 | 83.5 |
| Reactive Alumina (0.4 micron) | 5.0 | 5.0 | 5.0 | — |
| Reactive Alumina (3.0 micron) | 5.0 | 5.0 | 5.0 | — |
| Calcium Aluminate Cement | 1.5 | 1.5 | 1.5 | 1.5 |
| Thermax Floform N-990 Thermal Black (Cancarb Limited) | 5.0 | — | — | 15.0 |
| N-990 Thermal Carbon Black (Engineered Carbons, Inc.) | — | 5.0 | — | — |
| N-774 Furnace Carbon Black (Engineered Carbons, Inc.) | — | — | 5.0 | — |
| Plus Additions: | | | | |
| Marasperse CBA-1 Dispersant | 0.2 | 0.2 | 0.5 | 0.5 |
| Polypropylene-Based Fibers | 0.15 | 0.15 | 0.15 | 0.15 |
| % Water for Casting: | 4.5 | 4.5 | 5.5 | 5.5 |
| Casting Characteristics | | | | |
| Flow Diameter, inches: | 3.75 | 3.75 | 3.50 | 4.0 |
| Comments: | Good | Good | Good | Very Good |
| After Drying at 230° F. | | | | |
| Density from Porosity, pcf: | 198 | 197 | 183 | 173 |
| Apparent Porosity, %: | 12.5 | 12.9 | 18.5 | 15.9 |
| After Coking at 2000° F. | | | | |
| Density from Porosity, pcf: | 195 | 194 | 183 | 172 |
| Apparent Porosity, %: | 15.3 | 15.7 | 20.4 | 18.5 |

| | |
|---|---|
| % Held on 4 mesh (Tyler) | 13 ± 5 |
| % Held on 10 mesh | 40 ± 6 |
| % Pass 10 mesh, Held on 28 mesh | 12 |
| % Pass 28 mesh, Held on 65 mesh | 10 |
| % Pass 65 mesh | 38 ± 6 |
| % Pass 150 mesh | 32 ± 6 |
| % Pass 325 mesh | 29 ± 5 |

Example 14

Example 14 sets forth an example of employing a thermal black and reactive alumina as the ultrafine refractory material in a non-slumping, high density, low moisture sprayable, pumpable refractory castable composition of the instant invention that can be applied without forms. In Example 14, the flocculating agent was added at the time of installation in an amount sufficient to give a bulk density of at least 110 pcf The flocculating agent in Example 14 was employed in an amount of about 0.4 weight percent of a thirty-two percent calcium chloride solution. The purpose of this flocculating agent is to "over-power" or eliminate the effect of the dispersant in making the tempered castable. The flocculating agent acts to turn the low moisture castable instantly into a viscous plastic mass, making it sticky enough at its existing low water level to be sprayed onto a surface without slumping and without the need for forms. The flocculating agent reacts with all of the refractory castable composition components causing them to agglomerate.

In Example 14, water is added in an amount sufficient to achieve a pumpable consistency suitable for use with pump means and the associated hose means and nozzle means utilized therewith. Such pump means, hose means and nozzle means are conventional and well known by those skilled in the art. For example, the nozzle means may have an air line hookup where air is fed to the nozzle means in order to take the pumpable refractory castable composition into a form such that it is sprayed onto a surface to be lined with the sprayable refractory castable composition. Preferably, the flocculating agent is added through the air line associated with the nozzle means and is admixed with the tempered pumpable first component of the sprayable refractory castable composition just as it is sprayed onto a surface, such as for example, the surface of a metallurgical vessel. If desired, the flocculating agent can be added by means of any conventional pump and a "Y" interconnect to the air line, so that the flocculating agent can be added at the proper rate directly to the refractory castable composition at the nozzle.

It will be appreciate by those skilled in the art that while Example 14 discloses adding the flocculating agent to the refractory castable composition at the nozzle means, the flocculating agent may be added upstream of the nozzle means, such as for example, through the hose means at or just prior to installation of the sprayable refractory castable composition.

The amount of flocculating agent is critical since it can adversely affect the desired bulk density of the castable. Bulk density is considered the most important physical property for a refractory castable, in that all other important properties such as strength is directly proportional to the density of any given castable composition. Thus, as density decreases, strength also decreases. With the castables of the present invention, the bulk density should be at least 110 pcf (pounds per cubic foot, lbs./ft$^3$), and preferably greater than 130 pcf The amount of flocculating agent added, as described herein, must therefore be carefully controlled.

As will be appreciated and known by those skilled in the art, another pump means for feeding the flocculating agent to the nozzle means or hose means must have the capacity to match the pump means for pumping the refractory castable composition at its given material output, and must be able to generate enough pressure to overcome the air pressure in the line, which is ordinarily about 50 to 100 psi (pounds per square inch).

With respect to the amount of water added in order to have the satisfactory tempered mix; that is, to have an adequate pump cast consistency, the amount will vary, dependent mainly upon the particular components in the mix, the particular pump means utilized, the length of hose means by which it is supplied, and the air pressure. These are all readily calculable by those skilled in this art. The amount of water added to properly temper the refractory castable composition to obtain a proper pump cast consistency, is such that it could be run through pump means, and through about 25 to 200 feet of hose means, and placed on a surface utilizing about 80 psi (pounds per square inch) air pressure.

In Example 14, an Allentown Powercreter Pro swing valve piston pump and a 500 psi diaphragm chemical pump to move the flocculating agent were used. A 350-cfm (cubic feet per minute) air compressor was used as the source of air feed and air was injected into the nozzle at 90 psi pressure. The sprayable refractory castable composition was tested by spraying the material onto a vertical surface, then cutting the sprayed panel on a diamond saw into the desired test speciments after curing.

In Example 14, the Calcined Chinese Bauxite is approximately an 85 to 90 weight % alumina grain from China commercially available through F & S International, New York, N.Y., which is crushed and ground into the desired screen fractions. The Dead Burned Magnesia is approximately a 98 weight % magnesia grain such as H-W 98 Magnesite commercially available from Harbison-Walker Refractories Company, Pittsburgh, Pa., which is crushed and ground into the desired screen fractions. The sulfur powder is sulfur powder commercially available from Rhone-Poulenc Basic Chemicals Co., Shelton, Conn. The citric acid is citric acid, Anhydrous, FCC, USP, commercially available from Haarmann & Reimer Corp., Elkhart, Ind. The fiber addition is polypropylene fiber commercially available under the trade name "Herculon" non-woven staple fibers (Denier=3.0, Length=5.0 mm) commercially available from Hercules Incorporated, Wilmington, Del.

| Example Number: | 14<br>Weight % |
|---|---|
| Mix: | |
| Calcined Chinese Bauxite (−4 mesh and finer) | 75 |
| Dead Burned Magnesia (−10 mesh and finer) | 6 |
| Reactive Alumina (0.4 micron) | 5.0 |
| Reactive Alumina (3.0 micron) | 5.0 |
| Calcium Aluminate Cement | 3 |
| Thermax Floform N-990 Thermal Black (Cancarb Limited) | 5 |
| Silicon Metal, −200 mesh | 3 |
| Powdered Novolak Resin | 2 |
| Plus Additions: | |
| Marasperse CBA-1 Dispersant | 0.1 |
| Sulfur Powder | 0.1 |
| Citric Acid | 0.03 |
| Polypropylene-Based Fibers | 0.1 |
| Water to Achieve a Pump Cast Consistency | 8.0 |
| Application Rate and Test Results | |
| Refractory Composition Pump Feed Rate: | 300 lbs/min. (pounds/minute) |
| Flocculant Pump Feed Rate: | 0.2 Gal/min. (gallons/minute) |
| Bulk Density, pcf After Drying at 350° F.: | 154 |
| Cold Crushing Strength, psi After Drying at 350° F.: | 4080 |

In Example 14, thermal black was used in conjunction with silicon metal and powdered novolak resin in a bauxite-based, ultralow cement (<1.0 wt. % CaO) castable. Dead burned magnesia was added to this composition to form magnesium aluminate spinel in situ at elevated temperatures. The combination of thermal black and magnesium aluminate spinel in an alumina-based composition provides improved corrosion resistance to metallurgical slags.

Sulfur powder is added to help prevent hydration of the magnesia; citric acid is added to extend the working time of the castable; and polypropylene-based fibers were added to facilitate moisture removal upon heat up of the material. These additives are known by those skilled in the art and are used in conventional amounts. This example demonstrates that a non-slumping, pumpable, sprayable refractory castable composition containing thermal black and Reactive Aluminas as the ultrafine refractory material can be applied using the installation method as described herein resulting in a sprayable refractory castable product having good density and strength.

Whereas particular embodiments of the instant invention have been described for the purposes of illustration, it will be evidence to those persons skilled in the art that numerous variations and details of the instant invention may be made without departing from the instant invention as defined in the appended claims.

What is claimed is:

1. A refractory composition comprising from about 60 to 90 weight percent of a refractory aggregate wherein said refractory aggregate comprises a magnesium oxide, from about 2 to 25 weight percent of an ultrafine refractory material having an average particle diameter size less than or equal to about 3 microns, from about 0.5 to 15 weight percent of a binder wherein said binder comprises pitch, and from about 0.05 to 2.0 weight percent of a dispersant wherein said dispersant comprises an anionic dispersing agent, wherein all or a portion of said ultrafine refractory material comprises a thermal black such that said refractory composition comprises from about 2 to 15 weight percent of said thermal black.

2. The refractory composition of claim 1 comprising from about 2 to 15 weight percent of said ultrafine refractory material and wherein all of said ultrafine refractory material is said thermal black.

3. The refractory composition of claim 1 wherein said ultrafine refractory material comprises said thermal black and a fumed silica.

4. The refractory composition of claim 3 wherein said anionic dispersing agent comprises at least one of a polymerized alkyl naphthalene sulfonic acid, a modified lignin, and salts thereof.

5. The refractory composition of claim 1 wherein said thermal black is an American Society for Testing and Materials (ASTM) Designation 1765-96, having an average nitrogen surface area defined by Classification Group Numbers 8 and 9 of said ASTM Designation D1765-96.

6. The refractory composition of claim 1 further comprising from about 1 to 10 weight percent of at least one metal.

7. The refractory composition of claim 1 further comprising from about 0.1 to 1.0 weight percent of at least one fiber.

8. A refractory castable composition comprising (a) 100 weight percent of a refractory composition comprising from about 60 to 90 weight percent of a refractory aggregate, from about 2 to 25 weight percent of an ultrafine refractory material having an average particle diameter size less than or equal to about 3 microns, from about 0.5 to 15 weight percent of a binder, and from about 0.05 to 2.0 weight percent of a dispersant, wherein all or a portion of said ultrafine refractory material comprises a thermal black such that said refractory composition comprises from about 2 to 15 weight percent of said thermal black, and (b) from about 3 to 10 weight percent water based upon 100 weight percent of said refractory composition, wherein said water is present in an amount sufficient to achieve a castable consistency.

9. The refractory composition of claim 8 comprising from about 2 to 15 weight percent of said ultrafine refractory material and wherein all of said ultrafine refractory material is said thermal black.

10. The refractory castable composition of claim 8 wherein said ultrafine refractory material comprises said thermal black and a fumed silica.

11. The refractory castable composition of claim 10 wherein said anionic dispersing agent comprises at least one of a polymerized alkyl naphthalene sulfonic acid, a modified lignin, and salts thereof.

12. The refractory castable composition of claim 8 wherein said thermal black is an American Society for Testing Materials (ASTM) Designation 1765-96 having an average nitrogen surface area defined by Classification Group Numbers 8 and 9 of said ASTM Designation D17645-96.

13. The refractory castable composition of claim 8 further comprising from about 1 to 10 weight percent of at least one metal.

14. The refractory composition of claim 8 further comprising from about 0.1 to 1.0 weight percent of at least one fiber.

* * * * *